Jan. 24, 1967   K. ROOZENDAAL ET AL   3,299,647
DEVICE FOR SEPARATING IN A SOLID STATE COMPONENTS FROM
A GAS MIXTURE BY COOLING AND GAS SEPARATING PLANT
PROVIDED WITH ONE OR MORE OF THESE DEVICES
Filed Sept. 11, 1962   4 Sheets-Sheet 1
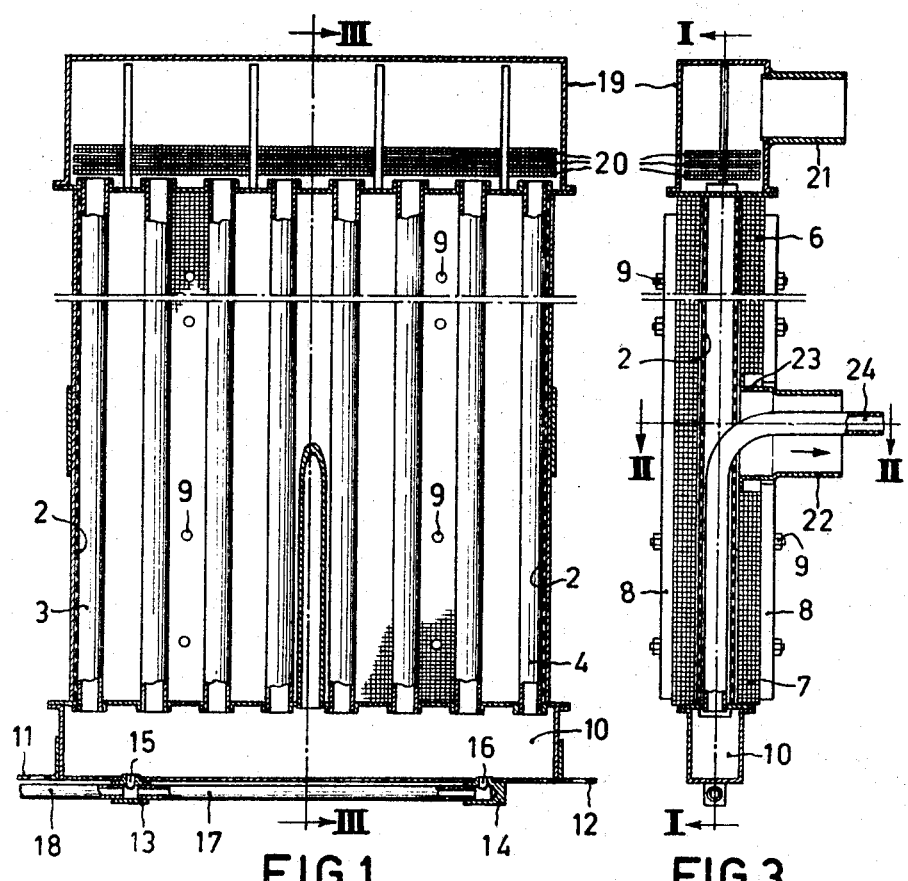
INVENTOR
KLAAS ROOZENDAAL
JOHANNES VAN DER STER
BY
AGENT Jan. 24, 1967 K. ROOZENDAAL ET AL 3,299,647
DEVICE FOR SEPARATING IN A SOLID STATE COMPONENTS FROM
A GAS MIXTURE BY COOLING AND GAS SEPARATING PLANT
PROVIDED WITH ONE OR MORE OF THESE DEVICES
Filed Sept. 11, 1962 4 Sheets-Sheet 3

INVENTORS
KLAAS ROOZENDAAL
JOHANNES VAN DER STER
BY

AGENT

# United States Patent Office 3,299,647
Patented Jan. 24, 1967

3,299,647
DEVICE FOR SEPARATING IN A SOLID STATE COMPONENTS FROM A GAS MIXTURE BY COOLING AND GAS SEPARATING PLANT PROVIDED WITH ONE OR MORE OF THESE DEVICES
Klaas Roozendaal and Johannes van der Ster, Emmasingel, Eindhoven, Netherlands, assignors to North American Philips Company, Inc., New York, N.Y., a corporation of Delaware
Filed Sept. 11, 1962, Ser. No. 222,860
Claims priority, application Netherlands, Sept. 20, 1961, 269,432
4 Claims. (Cl. 62—42)

Improvements in apparatus for separating components in a solid state from a gaseous mixture by cooling said gaseous mixture to solidify said components and separating the gaseous phase therefrom in a plant that is provided with at least one of these apparatuses.

The apparatus comprises a mass that is cooled, said mass being permeable to gases.

Often it is desirable to purify the gaseous mixture retaining carbon dioxide gas and water vapor, before these components are separated out or condensed from the gaseous mixture. On cooling, these components begin to solidify at much higher temperatures than the temperatures at which separation or condensation takes place and deposit as ice or snow. This may be annoying, because the solidification of the components may clog channels in heat exchangers or contaminate condensate where condensate is desired.

A variety of apparatuses have been constructed for removing water vapor and carbon dioxide from a gaseous mixture, for example one apparatus utilized includes a gas pervious material such as a sheet of wire gauze that is attached to a refrigerator. The sheet of gauze is placed in the path of a gaseous mixture providing a surface wherein the water vapor and carbon dioxide may deposit out in the form of snow.

In said apparatus it has been surprisingly noted that it is possible to deposit numerous successive layers of snow on the gauze and the flow of gas therethrough is not unduly limited. The components to be separated out deposit not only on the layer of snow but also in that layer without immediately clogging it.

It has appeared, however, that this possibility is present only if the gas-permeable wall is readily cooled.

It is known for this purpose to solder the gauze to readily conductive blocks which are connected to a refrigerator or, for example, to pipes which are cooled by liquid gas.

A difficulty in these known apparatuses is to obtain a sufficiently large surface area with the permissible dimensions on which surface area the component may deposit. This involves that with these known apparatuses the thickness of the layer of snow builds up comparatively rapidly so that the gas mixture experiences too large a resistance to flow which renders cleaning of the apparatus necessary. From an economical standpoint it is of importance that the period of time between two cleanings is as large as possible.

The invention provides an extremely simple and compact construction in which a large surface area of cooled gas-permeable material is present all the same and is characterized in that two layers of gas-permeable material are present in the device in which a number of spacing members constructed for cooling are provided between these layers, said spacing members being in heat-conductive contact with those layers, a gas-intake channel emptying in the space between these two layers of gas-permeable material.

In this apparatus, the gas mixture containing the components to be separated, may flow to the device from two sides, a layer of snow depositing on both layers of gas-permeable material. The great advantage is that with the device according to the invention a quantity of gas mixture larger than in the known devices of this type can be processed before the apparatus is required to be cleaned. The gas-permeable layers may, for example, be constituted by layers of metal gauze wire, although other porous material also may be utilized for these layers.

The spacing members constructed for cooling may comprise channels in which a liquid gas or gas mixture is contained which maintains these spacing members at a sufficiently low temperature. The liquid gas or liquid gas mixture is pumped through the channels. The channels in the spacing members may be located in the horizontal plane and also be arranged so that they enclose an angle with the horizontal plane.

A favourable embodiment of the device according to the invention is characterized in that the spacing members comprise cooling channels which enclose an angle with the horizontal plane, said channels being connected with their one end to a space in which, and at least in the lower part of the channels, a liquid gas may be present, the boiling point of which is lower than the temperature at which the components to be separated solidify, while the channels at their other side also empty in a common space which comprises a gas outlet aperture, said two spaces being connected together by at least one pipe, said pipe being provided in the apparatus and/or constructed so that liquid gas or liquid gas mixture may flow back through it from the upper space to the lower space.

This construction has the advantage that no pump is required for the transport of the liquid gas or liquid gas mixture through the channels. The transport of the liquid gas or the liquid gas mixture through the channels takes place by a pumping effect by steam bubbles occurring in the channels as a result of the heat supply to these channels. The heat required for maintaining the pumping effect by steam bubbles in the channels originates from the gas mixture to be purified which is cooled, while in addition heat becomes available when the components solidify and deposit on the gas-permeable material layers. As a result of the pumping effect by steam bubbles, the liquid gas or liquid gas mixture is pumped through the channels, as a result of which the spacing members and consequently also the layers of material which are in heat-conductive contact with them are evenly cooled throughout their length. The gas evaporated in the channels and the pumped liquid gas or liquid gas mixture reaches the upper space. The vapour is conducted away through the gas outlet aperture provided in this space, while the liquid gas or liquid gas mixture is conducted back to the lower space via the connecting pipe between the upper and the lower space. This liquid return pipe should be constructed so that no pumping effect by steam bubbles can occur in it. This may be reached by ensuring that the heat current supplied to this pipe is considerably smaller than the heat current supplied to the channels in the spacing members. This condition may be satisfied, for example, by insulating the pipe or providing it at a point in the apparatus so that this pipe is not heated or is heated to a lesser extent than is the case for the channels in the spacing members by the flowing gas mixture.

A further favourable embodiment of the apparatus according to the invention is characterized in that the spacing members are formed by pipes and each of the pipes through which liquid gas or liquid gas mixture can be returned from the upper to the lower space is formed by a pipe corresponding to said pipes, a greater thermal resistance prevailing between these liquid return pipes and the gas-permeable layers than between the other pipes of the apparatus and these layers.

A further favourable embodiment of the apparatus according to the invention is characterized in that the pipes are arranged in a flat plane, the gas-permeable layers each being located on one side of that plane and being connected to the pipes, the two extreme pipes not being connected to these layers. Because the two extreme pipes are not connected to the layers, the heat transmission resistance between the layers and these pipes will be comparatively large, so that in these pipes no pumping effect by steam bubbles will occur and the pumped liquid can flow back through these pipes.

A favourable embodiment of the device according to the invention in which the spacing members are at least substantially vertical is characterized in that the connection of the gas intake pipe extends in an at least substantially horizontal plane throughout the width of the apparatus, the distance from this connection to the lower side of the apparatus being smaller than half the height of the apparatus.

If the spacing members are substantially vertical, the gas mixture which has cooled during the passage of the gas permeable layers will tend to fall. If the intake pipe would be provided in the center of the apparatus, more gas mixture would flow through the gas-permeable layers in the upper half of the apparatus than in the lower half. It is even possible that the gas mixture which enters the space between the layers on the upper side of the device through the gas-permeable layers would leave the space between the layers through the lower part of the gas-permeable layers instead of through the intake pipe as a result of the falling and the resulting increase in pressure. This drawback is overcome by connecting the intake pipe according to the invention not in the center but below the center.

The falling of the gas after passing the gas-permeable layers may in addition be overcome according to the invention by filling the channel between the two gas-permeable layers with a filling material. For this filling material, saddle-shaped pieces of gauze or metal shavings, metal spirals, etc. may be used.

A further favourable embodiment of the apparatus according to the invention is characterized in that before the orifices of the channels in the upper space one or more layers of metal gauze wire are provided.

If in the channels a strong vapor lift effect is achieved the pumped liquid will leave the channels at the upper side with a somewhat spouting effect. This involves the danger that with the released vapour also liquid is conducted along out of the upper space. By providing metal gauze wire over the orifices of the channels in the upper space it is reached that the spouting effect is overcome and the released vapour is at least substantially free from liquid.

The apparatus for separating in a solid state components from a gas mixture by cooling may in particular be used readily in a gas-separating plant. Such a plant which also comprises a column is characterized according to the invention in that one or more of the apparatus according to the invention are provided around the column, the lower space of each of the apparatus being in a communicating connection with the lower part of the column, the upper space being in open connection with the plant in a manner such that gas can flow to the plant, at least partially, but liquid cannot flow to the plant.

By using the device according to the invention in a comparatively compact construction, a large quantity of snow may be caught before the plant has to be cleaned. The possibility exists to provide a number of the apparatus according to the invention as separate units around the column, for example in the form of a polygon.

If the gas supplied to the separating plant before having passed the gas-permeable layers of the apparatus according to the invention comes in contact with structural members which are colder during operation, strong whirls are formed by convection in the current of gas mixture and ice crystals are formed already in the gas current owing to the strong cooling. The result is that the layers of snow forming on these permeable layers rapidly get clogged because, as is sometimes said, the layer of snow "silts up."

In order to prevent this, the gas-separating plant according to the invention is characterized in that those structural members of the plant which, during operation, are colder than the in-flowing gas mixture and along which the gas mixture to be separated brushes before it has passed the gas-permeable layers of material of the devices for separating in a solid state components from a gas mixture, are provided with an insulation which checks the heat exchange between the inflowing gas mixture and those parts. This insulation may be constituted by an insulating layer of material. It is also possible to insulate these members by constructing them double-walled, the insulation then being constituted by the air gap between these walls.

In order that the invention may readily be carried into effect, one embodiment thereof will now be described more fully, by way of example, with reference to the accompanying drawing which is not drawn to scale and in which:

FIGURES 1, 2 and 3 show three cross-sections mutually at right angles through an embodiment of a device for separating in a solid state components from a gas mixture;

Figure 4:
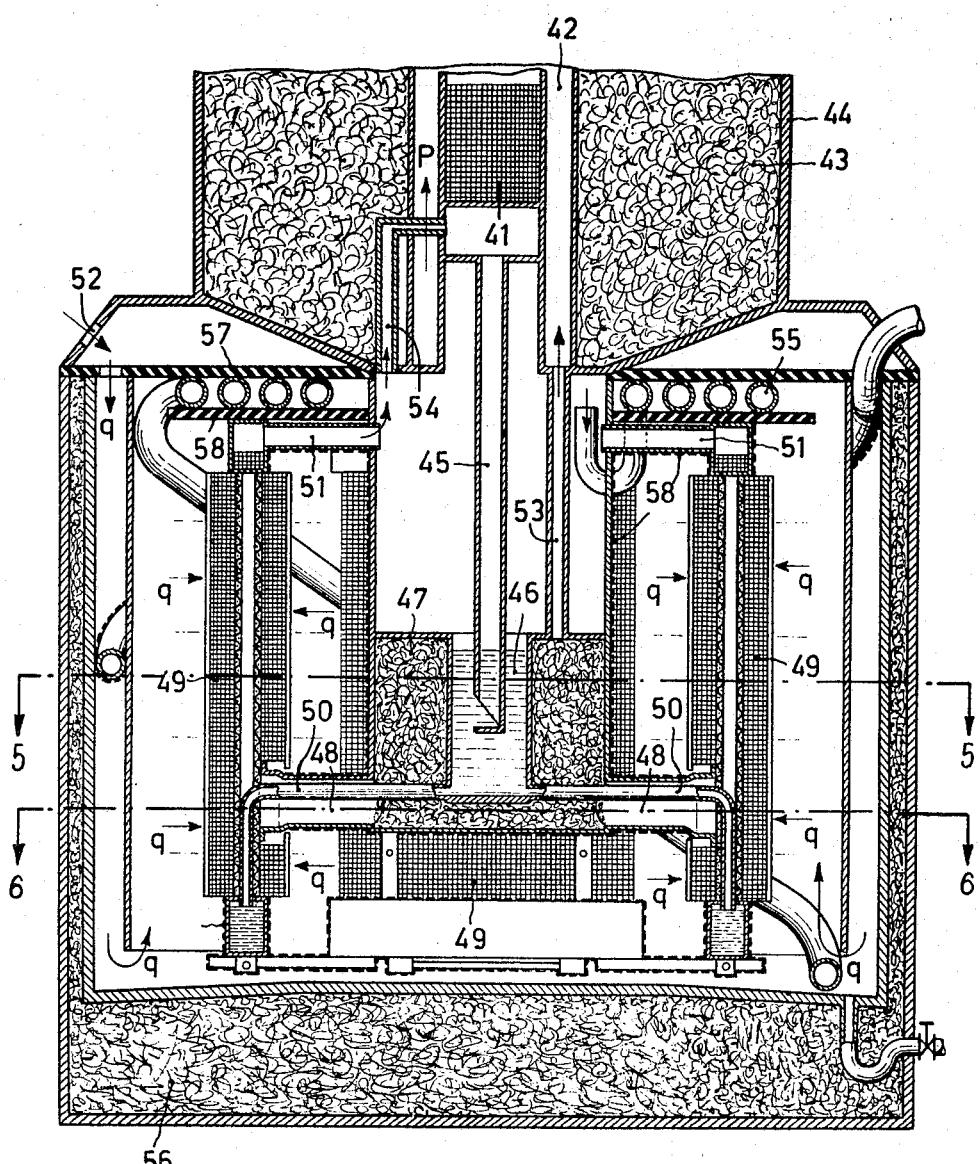
FIGURE 4 shows a cross-section through a part of a gas separating plant, the device shown in FIGURES 1, 2 and 3 being used for cleaning the gas mixture to be separated.
Figure 5:
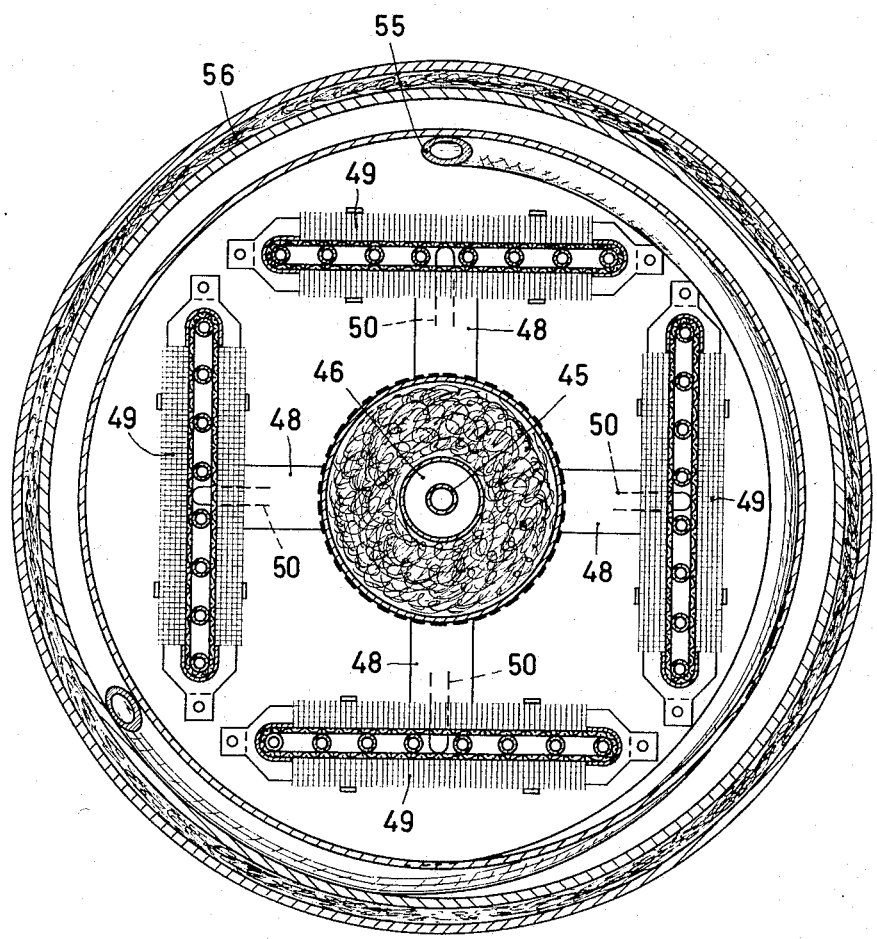
FIGURE 5 is a cross-sectional view taken on the line 5—5 of FIG. 4
Figure 6:
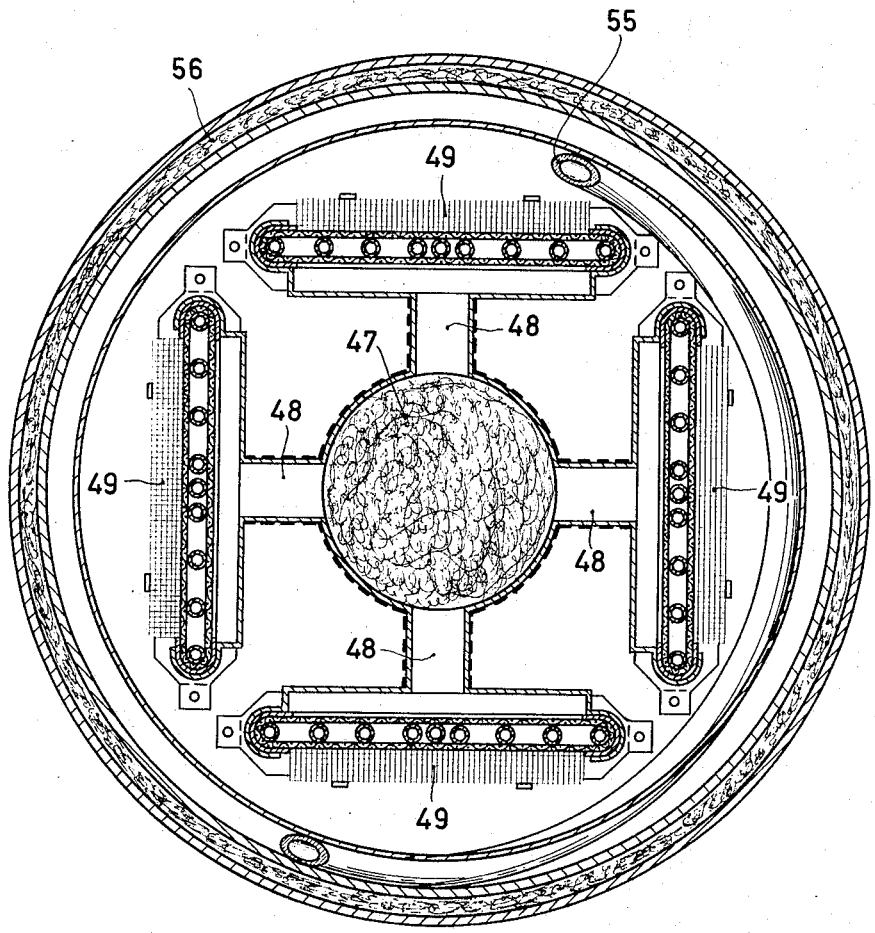
FIGURE 6 is a cross-sectional view taken on the line 6—6 of FIG. 4.

In FIGURES 1, 2 and 3 a number of pipes are indicated by reference numeral 1. To these pipes 1 a layer of metal gauze wire 2 is soldered. The extreme two pipes 3 and 4 are located within this layer of gauze wire it is true, but are not soldered to it, however, so that between these pipes and the layer of gauze wire 2 there exists a less favourable heat conduction than between the pipes 1 and the layer of gauze wire 2. In addition, on one side of the layer of gauze wire 2 a layer of gauze wire 5 folded in a zig-zag manner is soldered, while on the other side a layer of metal gauze wire is soldered to the layer 2 and consists of two parts 6 and 7 also folded in a zig-zag manner. For connecting the layers of gauze wire 5, 6 and 7, strips 8 are provided which are pressed against the metal gauze wire by bolt-and-nut joints 9. The pipes 1 and also the extreme pipes 3 and 4 are connected at the lower side to a container for liquid 10. The container for liquid 10 is in addition provided with angle-sections 11 and 12, by means of which the device may be fastened to a foundation. To this container 10 are in addition connected the structural members 13 and 14. These members are provided with bores 15 and 16 which are in communication with the container for liquid 10 and are connected together by the pipe 17. The structural members 13 is in addition provided with an outlet pipe 18 which is only partially shown. The pipes 1 and also the pipes 3 and 4 are connected at their upper ends to a container 19. In this container 19 some layers of metal gauze wire 20 are provided above the orifices of the pipes. A gas outlet channel 21 is connected to the container 19. The device comprises in addition a gas intake channel 22 which is connected to the device through a nozzle 23 which extends throughout the width of the device. A liquid pipe 24 is connected to the container 10. This liquid pipe 24 serves for the supply of liquid gas mixture to the container 10 and may be connected to a container for this liquid gas mixture not shown, which container may be formed by the lower part of a rectifying column.

The operation of the device is as follows. Via the liquid pipe 24, the container 10 is in a communicating connection with a container with liquid gas mixture. As a result of this connection, also the container 10 and part of the pipes 1, 3 and 4 are filled with liquid and consequently a cold gas mixture. As a result of this the pipes and the layers of gauze wire 2, 5, 6 and 7 which are in a heat-exchanging contact with said pipes become cold. In the gas intake channel 22 a negative pressure is produced, as a result of which the gas between the pipes and the layer of gauze wire, for example air, is drained off. As a result of this, a negative pressure is also produced in the space between the two layers of gauze wire and the gas or gas mixture outside the device will flow to this space via the cold layers of gauze wire. If the layers of gauze wire 2, 5, 6 and 7 have a temperature which is below the temperature of sublimation of the components from which the gas mixture has to be purified, these components will deposit in a solid state on the gauze wire. It is clear that to reach this temperature and to maintain it, it is necessary that the liquid gas in the pipes 1, 3 and 4 should have a boiling point which is lower than the temperature of sublimation of the components to be separated.

As a result of the gas mixture flowing towards the device, heat will be transmitted to the layers of gauze wire. Via the layers of gauze wire and the pipes 1, this heat will be transmitted to the liquid gas in those pipes, which starts boiling as a result of which a kind of pumping effect by vapour bubbles occurs in the pipes.

As a result of the pumping effect by steam bubbles in the pipes, liquefied gas will be pumped into the space 19, while also the resulting vapour enters this space. The vapour is conducted out of this space through the gas outlet channel 21. The liquid pumped into the space 19 may return to the container 10 through the pipes 3 and 4. The return pipes 3 and 4 are not connected to the layer of gauze 2 and consequently not to the gauze folded in a zig-zag manner either, so that the heat-transmission resistance between these pipes and the gauze wire is much larger than between the pipes 1 and the gauze wire, as a result of which no pumping effect by steam bubbles occurs in the pipes 3 and 4 and the liquid from the container 19 may flow back to the container 10.

In the case of a large supply of heat to the liquid in the pipes, a strong pumping effect will occur in the pipes 1, as a result of which the pumped liquid spouts into the space 19. Without further measures, there is a fair chance that a quantity of this liquid gas flows along with the vapour which is conducted away. In order to prevent this a number of layers of metal gauze wire 20 are provided in the space 19 over the orifices of the pipes. As a result of this, the possibly occurring spouting of the liquid out of the pipes is checked.

The purified gas mixture is drawn off through the gas intake pipe.

After some time the layer of solid components depositing on the layers of gauze wire has become thick so that cleaning becomes necessary. This cleaning is effected by heating the apparatus. It may occur sometimes that some water is in the device which is collected in the container 10 during heating. This water may be removed out of the apparatus through the outlet pipe 18.

As appears from the drawing, the gas intake pipe 22 is connected with its nozzle 23 below the center of the apparatus. This has been effected with a view to the fact that the on-flowing gas mixture after passage of the layers of gauze wire has become colder and consequently heavier so that this gas falls. In order to prevent the negative pressure in the space between the layers of gauze wire from being larger in the upper half than in the lower half of the apparatus, the gas intake pipe is connected to the lower part of the device. As a result of this it is reached that the quantity of gas which passes the layers of gauze wire per unit of surface area is substantially the same throughout the device.

This effect may even be intensified by filling the space between the layers of gauze wire with some filling material which increases the resistance to flow, as a result of which flowing of the gas from the upper half to the lower half is checked.

The device according to the invention may advantageously be used for cleaning a gas mixture before this gas mixture is admitted to a rectifying column. For this purpose, the gas intake pipe 22 is connected to the inlet aperture of the column. The liquid supply pipe 24 and the vapour outlet pipe 21 are connected to the lower part of the rectifying column.

An example of the above use of the apparatus according to the invention is shown in FIGURE 4 in which the lower part of a gas separating plant is shown in cross-section, four apparatus according to the invention being used for cleaning the gas mixture.

The column, of which the lower part is indicated by 41, extends upward with a part which is not shown. Around the part 41 an annular channel 42 is provided in which the gas mixture to be separated flows upwards in the direction of the arrows P, this gas mixture being admitted to the column at a higher position not shown. Around the column there is the insulation 43 which is incorporated in a housing 44. The bottom of the column 41 comprises an outlet pipe 45 which extends into a container 46 in which the liquid component of the gas mixture having the highest boiling joint is accumulated. Around this container 46 there is a space 47 which is partly filled with a filtering material which, on starting of the plant, serves as purifying filter of the gas mixture. The space 47 is connected by four gas intake channels 48 to four apparatus 49, provided around the space 47 which apparatus are constructed entirely in accordance with the apparatus shown in FIGURES 1, 2 and 3. The cooling liquid required for these apparatus is supplied through the pipes 50 which are connected to the container 46. The vapour developed in the pipes of the device 49 is returned to the upper side of the container 46 through the vapour outlet channels 51.

The gas mixture to be separated enters the plant through the inlet aperture 52 and then in the direction of the arrows q through the apparatus 49, the undesired components being separated in a solid state, and through the gas intake channels 48 to the space 47. Then the gas mixture enters the column through the pipes 53 (only one of which is illustrated) and in the direction of the arrows P.

The vapour leaving the vapour outlet channels 51 is conducted back through the channels 54 to the lower side of the column 41 and is partly conducted away out of the plant through the pipe 55. The lower part of the plant is incorporated in a double-walled insulating container 56 which is closed on its upper side by an insulating cover 57.

All structural members which are cold during operation of the plant, with the exception of the layers of gauze wire of the apparatus 49, which are in contact with the onflowing gas mixture are provided with an insulating layer 58 so as to prevent crystals from forming in the gas mixture owing to the sudden cooling and conduction occurring, as a result of which the layer of snow forming on the gas-permeable layers of material would "silt up."

Although the apparatus for separating in a solid state components from a gas mixture can particularly readily be used in gas separating plants, it may be well be used in other cases in which a gas mixture has to be purified from some admixtures.

What is claimed is:
1. An apparatus for separating out in a solid state by cooling components from a gaseous mixture comprising a plurality of pipes having a very low boiling point liquid conducted therethrough, a plurality of layers of gas permeable material located on opposite side of said pipes and in heat conducting relationship therewith, said layers of gas permeable material being at a temperature that is higher than the temperature of said pipes, the gaseous mixture to be cleaned flowing through said layers of gas permeable material and past said pipes, a gas exit channel for the purified gaseous mixture flowing through said layers of gas permeable material and separating out said components in a solid state thereon, and a liquid supply duct for said pipes located within at least a part of said gas exit channel.

2. An apparatus for separating out in a solid state by cooling components from a gas mixture as claimed in claim 1 wherein said pipes extend substantially vertical and said gas exit channel extends in at least substantially a horizontal plane and is located at a location which is approximately half the height of said apparatus.

3. A separating plant for separating out in a solid state by cooling components from a gas mixture comprising a fractionating column, a plurality of pipes for conducting therethrough a very low boiling point liquid, a plurality of layers of gas permeable material located on opposite sides of said pipes, the gas mixture to be cleaned flowing through both sides of said layers of permeable material toward said pipes, said pipes being in heat conductive relationship with said layers, a gas intake channel for the purified gas mixture communicating with a space located between said layers of gas permeable material, a lower common space connected to said pipes and an upper common space in communication with said pipes, said lower space also being in communication with the lower part of said column, the upper space being in open communication with said plant whereby said gas flows toward said plant there being a liquid separator in said space whereby the liquid cannot flow toward said plant.

4. A separating plant for separating out in a solid state by cooling components from a gas mixture as claimed in claim 3 further comprising structural members of said plant which, during operation, are colder than the in-flow gas mixture to be separated, and which the gas mixture to be separated out contacts before it has passed through said gas permeable layers of material, and an insulation controlling the heat exchange between said in-flow gas mixture and said structural members.

References Cited by the Examiner

UNITED STATES PATENTS

| | | | |
|---|---|---|---|
| 2,762,449 | 9/1956 | Sweeney | 55—82 |
| 2,771,153 | 11/1956 | Hennig | 55—517 |
| 2,827,267 | 3/1958 | Ris | 55—269 |
| 2,915,883 | 12/1959 | Van Der Ster | 62—13 |
| 2,925,878 | 2/1960 | Spann | 55—188 |
| 3,124,443 | 3/1964 | Hellingman et al. | 62—14 |
| 3,129,081 | 4/1964 | Van Geuns | 62—14 |
| 3,129,082 | 4/1964 | Roozendaal | 62—14 |

FOREIGN PATENTS 267,124    5/1961   Spain.

SAMIH N. ZAHARNA, *Primary Examiner.*

REUBEN FRIEDMAN, *Examiner.*

B. NOZICK, *Assistant Examiner.*